United States Patent
Check et al.

(10) Patent No.: US 7,089,408 B2
(45) Date of Patent: Aug. 8, 2006

(54) RE-FETCH OF LONG OPERAND BUFFERED REMAINDER AFTER CACHE LINE INVALIDATION IN OUT-OF-ORDER MULTIPROCESSOR SYSTEM WITHOUT INSTRUCTION RE-EXECUTION

(75) Inventors: Mark A. Check, Hopewell Junction, NY (US); Jennifer Navarro, Poughkeepsie, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 10/435,879

(22) Filed: May 12, 2003

(65) Prior Publication Data
US 2004/0230776 A1    Nov. 18, 2004

(51) Int. Cl.
*G06F 9/34* (2006.01)
(52) U.S. Cl. .......................... 712/225; 711/141
(58) Field of Classification Search ................ 711/135, 711/141; 712/216, 225
See application file for complete search history.

(56) References Cited

U.S. PATENT DOCUMENTS

| 4,189,768 | A | 2/1980 | Liptay et al. ............... 712/204 |
| 5,185,871 | A | 2/1993 | Frey et al. .................. 712/205 |
| 5,511,175 | A | 4/1996 | Favor et al. ................ 712/216 |
| 6,557,084 | B1* | 4/2003 | Freerksen et al. .......... 711/147 |
| 6,606,702 | B1* | 8/2003 | Guthrie et al. ............. 712/218 |

* cited by examiner

*Primary Examiner*—Kenneth S. Kim
(74) *Attorney, Agent, or Firm*—Lynn Augspurger; Cantor Colburn LLP

(57) ABSTRACT

A system and method to re-fetch operand data lost for instructions with operands greater than eight bytes in length due to line invalidation due to storage update from a single or plurality of processors in a multiprocessor computer system using microprocessors that perform out of order operand fetch with respect to sequential program order in which it is not possible or desirable to kill the execution of the instruction when the storage access rules require that it appear that the operand data is accessed in program execution order.

12 Claims, 4 Drawing Sheets

RE-FETCH OF LONG OPERAND BUFFERED REMAINDER AFTER CACHE LINE INVALIDATION IN OUT-OF-ORDER MULTIPROCESSOR SYSTEM WITHOUT INSTRUCTION RE-EXECUTION

RELATED APPLICATIONS

This application is related to United States Patent Application entitled "System and Method To Handle Page Validation in a Processor with Out-Of-Order Fetch", filed contemporaneously with this application now U.S. Pat. No. 6,973,552.

FIELD OF THE INVENTION

This invention relates to instruction operand data re-fetch of part of the operand after line invalidation due to storage update for long operands, greater than eight bytes in length, in a microprocessor with out of order operand fetch return from a cache storage with respect to sequential program instruction execution.

The invention particularly is directed to a system and method to re-fetch instruction operand data after a line invalidation in a multiprocessing computer system that because of storage ordering rules requires all data fetched out of order to be invalidated and that data to be fetched again for an instruction with a long operand in a microprocessor with in order instruction execution without canceling the instruction being executed and re-executing it.

The description set forth in this application is hereby incorporated into the present application by this reference. This application and the present application are owned by one and the same assignee, International Business Machines Corporation of Armonk, N.Y.

Trademarks: IBM® is a registered trademark of International Business Machines Corporation, Armonk, N.Y., U.S.A. S/390, z900 and z990 and other product names may be registered trademarks or product names of International Business Machines Corporation or other companies.

BACKGROUND

In computer architectures similar to the IBM Z/Architecture and its predecessors there are provisions made about access to computer storage. In this architecture, as defined in the IBM Z/Architecture Principles of Operation, Publication SA22-7832-00, numerous instructions exist that have one or more data operands that are longer than eight bytes (the basic operand length processed from the cache in the execution units). For each of these instructions as defined in the architecture there is a description of the storage rules. It is also common place in the computer processor or microprocessor that implement this architecture to have a cache storage with data organized on line boundaries.

To prevent system deadlocks in multiprocessing configurations the processor cache can not hold a cache line for the duration of instruction execution of instructions that take many cycles to execute. As a result there are cases where even if the processor units are still actively fetching data from this cache line the cache must release this line to another processor or processors in the system. When the line has been released to another processor, this other processor may update part or all of the line. This architecture allows for this behavior with some storage access rules. The architecture does not specify at what point in the operand for a given instruction execution that the update is detected. The architecture does specify that at what ever point the update to the operand data has been detected, all data for that operand prior to that point must be old data and all data after that point must be new data. The architecture does not allow access to old data for that operand data past a point in the operand where new data has been used.

The size of the unit of storage that an update to operand data must be detected in is dependent on the instruction. The size may be as small as one byte or as large as eight bytes. In U.S. Pat. No. 5,185,871 (owned by the assignee as the subject application) entitled "Coordination of Out-Of-Sequence Fetching Between Multiple Processors Using Re-execution of Instructions" discloses a processor that executes instructions out of order and can cancel any instruction right up to the point where the instruction can reach completion, the point at which the instruction's results are committed. U.S. Pat. No. 5,185,871 discloses that the cache monitors invalidates against lines in the cache and if data from one of those lines is being used by the cache it is reported to the processor and the entire instruction is canceled and re-executed. In this case, data is fetched again from the start of the operand. In this scheme, all of the data from a given line will always be from the same instant copy of the data.

However, it is contemplated in a future processor, for example a zSeries processor, to execute instructions in program order with an out of order operand fetch. This type of processor can not abort execution of an instruction once the instruction has started execution unless the entire contents of the processor including all cache contents are cleared and all architected state is restored from a protected check point copy, which is called a recovery action. In this type of processor this action is called processor recovery.

In normal program execution on a multiprocessor computer system it is likely to have data that has been fetched that will need to be invalidated. It is also likely that such invalidated data would be fetched out of order for instructions with long data operands. Furthermore, it is unacceptable processor performance to undergo a processor recovery action to deal with this.

Thus a solution is desirable that allows the instruction with long operands to continue execution and comply with the storage access rules without undergoing a processor recovery action.

SUMMARY OF THE INVENTION

In accordance with an exemplary embodiment of the invention, a system and method is disclosed to perform data operand re-fetch of the data for operands of greater than eight bytes (a doubleword) when there has been an invalidate of cache line that has returned operand data out of order for program execution. A contemplated microprocessor, including a future zSeries microprocessor, includes an operand buffer where data from the cache storage is returned. This data may be returned out of order from program execution. The operand buffer holds the data until the data is used in correct program order execution. The cache storage is configured to have knowledge of which cache lines are currently in the operand buffer. The cache storage monitors these lines for invalidation from the storage hierarchy. When a line that is in the operand buffer gets invalidated, the cache storage signals the same to the operand buffer. The operand buffer is configured to determine if data that has been returned out of order must be invalidated and what action should be taken. The operand buffer informs the cache storage when data from the operand buffer has been used by execution and no longer needs monitoring for invalidation. When the instruction has an operand of length less than eight bytes and the data is determined as being invalidated, the instruction will be canceled.

Exemplary embodiments of the system and method disclosed herein particularly relate to instructions with long operands (i.e., longer than eight bytes or a doubleword) that have started execution and invalidated data is found during the execution. The operand fetch logic and operand buffer logic to support this invention maintain information for each operand buffer indicative of where the data was fetched from storage and indicative of current program execution. Information is kept for each doubleword from storage indicative of a doubleword address in the storage line, which virtual address line, information to allow the cache to access the correct virtual to absolute storage (address translation) mapping. Information is maintained indicating which storage each doubleword(s) of data came from, if the data is valid, and if the data has been invalidated for each doubleword of data the execution unit(s) will operate on. The current point in the operand where data is being read by the execution units is also maintained.

If an invalidation of data in the operand buffer is indicted by the cache, all data past the point in the operand with valid data at the current read point is marked invalid. When program execution reaches a point in the operand where data was returned but marked invalid, program execution is temporarily halted. All requests being made to the cache storage for future operand data is stopped. The operand is re-fetched from the cache storage using information that is kept about each operand buffer and each doubleword that was fetched to fill that operand buffer. This process continues for each doubleword of cache data until one of the following occurs: the end of the operand is reached, the end of the storage line that was invalidated is reached, or the current point at which the operand is being fetched is reached. At that point fetching for the remaining operand data can be resumed. When operand data returns for the re-fetched data, program execution resumes without canceling the instruction that experienced the operand data invalidation.

These and other improvements are set forth in the following detailed description. For a better understanding of the invention with advantages and features, refer to the description and to the drawings.

The detailed description explains the preferred embodiments of the invention, together with advantages and features, by way of example with reference to the drawings.

DETAILED DESCRIPTION OF THE INVENTION

Embodiments of the invention provide a system and method to perform operand re-fetch of an operand for an instruction with an operand greater than one doubleword (i.e., greater than eight bytes) in length when the cache data line the data was fetched from gets invalidated by the storage hierarchy. When the instruction has an operand of length less than eight bytes when the data is determined as being invalidated, the instruction will be canceled, as disclosed in U.S. Pat. No. 5,185,871 as the instruction can not start execution unless all of the data is present and good, and will be started in the pipeline again if not.

Figure 1:
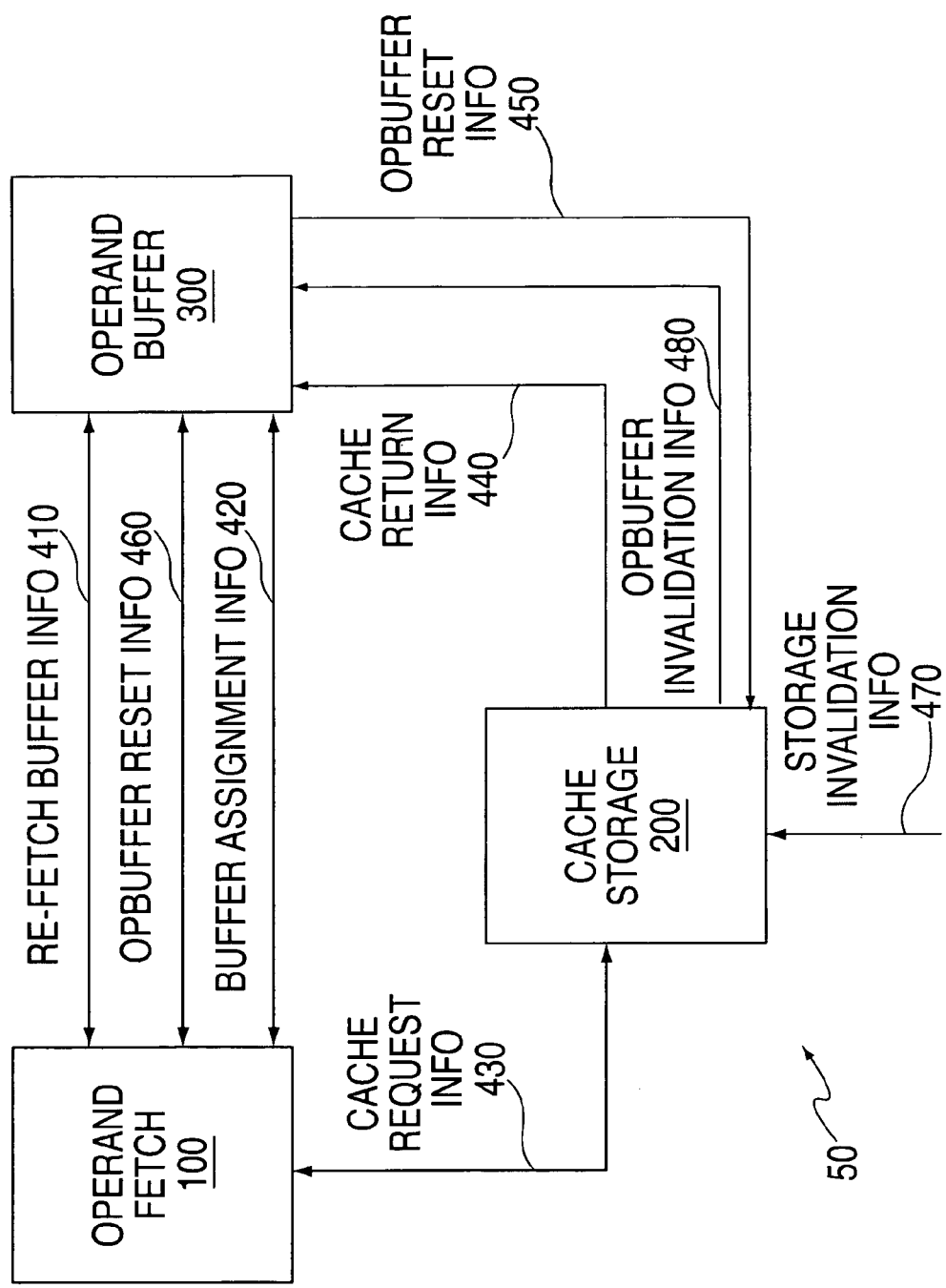
FIG. 1 illustrates operable connections between operand fetch, operand buffer, and cache storage parts of a processor to support operand re-fetch.

Referring to FIG. 1, operable connections between operand fetch logic 100, operand buffer 300 having corresponding operand buffer logic, and a cache storage 200 of a processor unit 50 to support operand re-fetch are illustrated. The operand fetch logic 100 makes a request to the cache storage or cache 200 by making requests over a request information bus 430. The operand fetch logic 100 also sends information about the operand and buffers to operand buffer 300 over a buffer assignment bus 420. The cache 200 returns information and data about the request to the operand buffer 300 over a cache return info bus 440.

Figure 2:
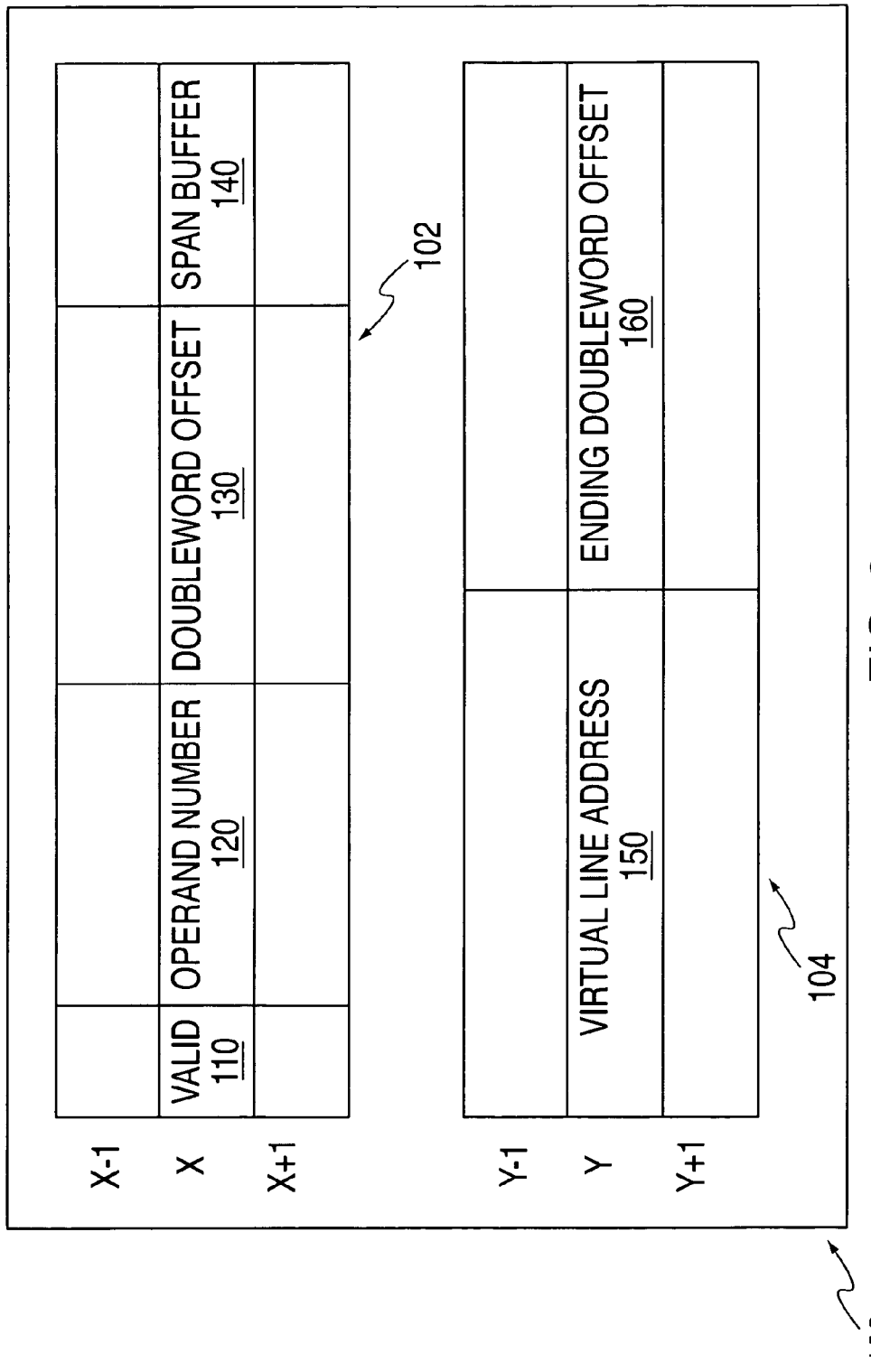
FIG. 2 illustrates information kept in the operand fetch to support operand re-fetch.

FIG. 2 illustrates information kept in the operand fetch logic 100 to support operand re-fetch. In particular, operand fetch logic 100 keeps information for each operand buffer generally indicated at 102 and information for each operand generally indicated at 104. When the operand fetch logic 100 makes the request it marks a buffer X valid 110, assigns an operand number 120, records the doubleword offset 130, and buffer span information 140 for the buffer. It also records the virtual line address 150 and ending doubleword offset 160 for each operand.

Figure 3:
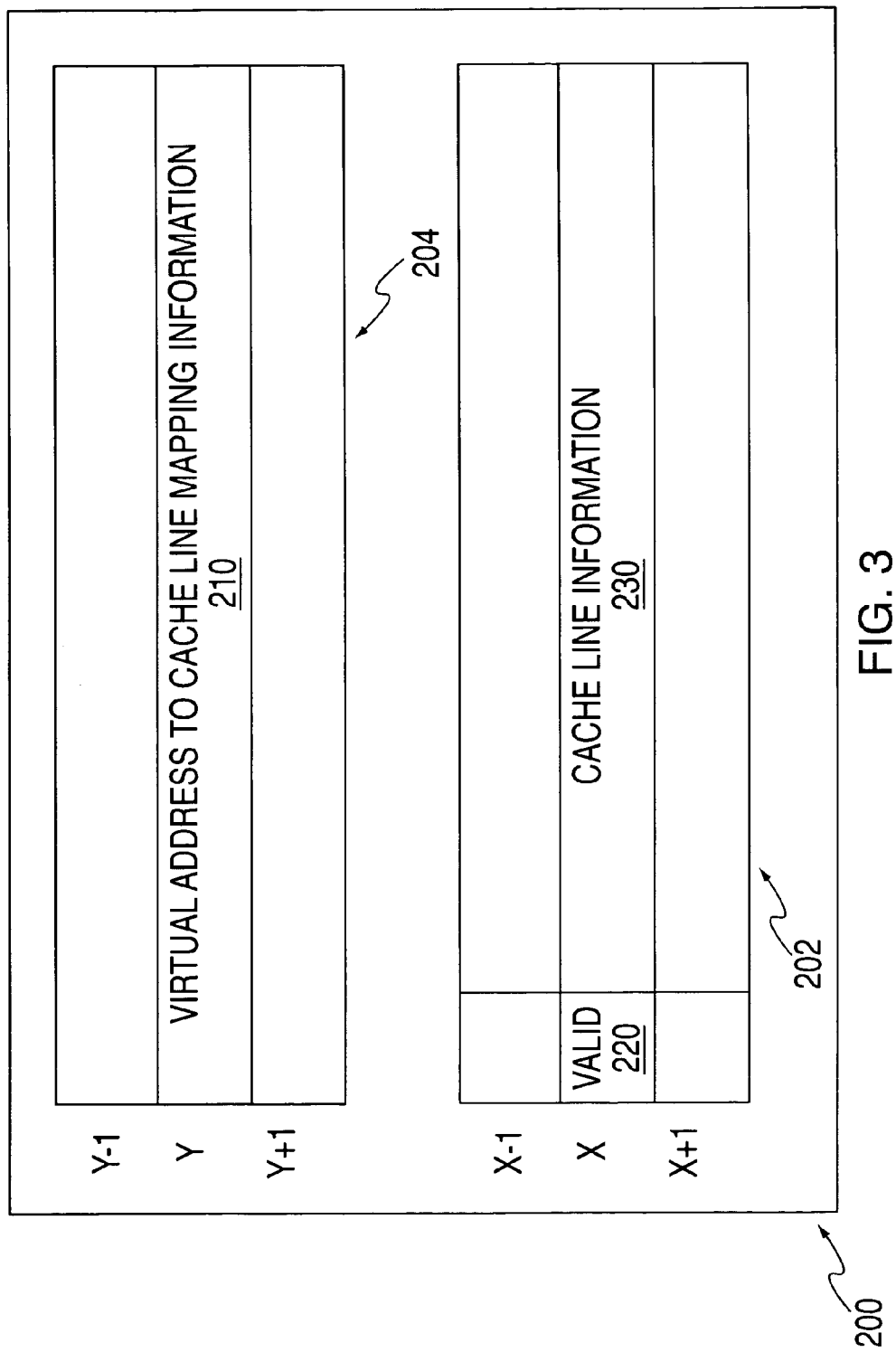
FIG. 3 illustrates information kept in the cache storage to support operand re-fetch.

FIG. 3 illustrates information kept in cache 200 to support operand re-fetch. In particular, cache 200 keeps information for each operand buffer generally indicated at 202 and information for each operand generally indicated at 204. The cache 200 for each operand records the information about what cache line 210 that each operand is for. When the cache 200 returns data to the operand buffers 300 it marks that buffer, i.e., buffer X, valid 220, and records which line in the cache is for that buffer in cache line information 230.

Figure 4:
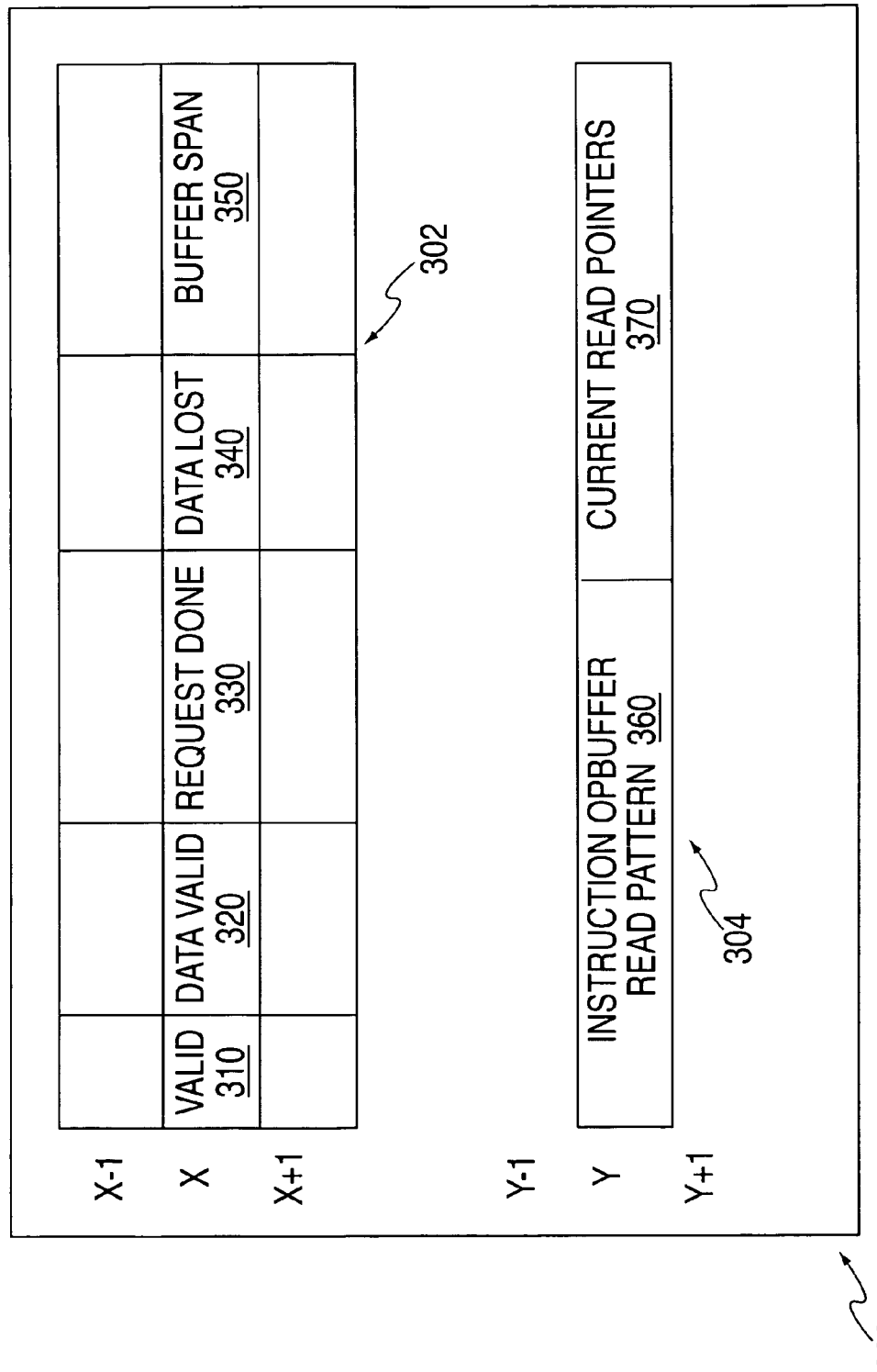
FIG. 4 illustrates information kept in the operand buffers to support operand re-fetch.

FIG. 4 illustrates information kept in the operand buffers 300 to support operand re-fetch. In particular, operand buffer 300 keeps information for each operand buffer generally indicated at 302 and information for a current instruction executing indicated at 304. When the operand fetch logic 100 informs the logic of operand buffer 300 about the buffer being assigned, the logic of operand buffer 300 marks the buffer valid 310 and information about buffer spanning 350. When the cache 200 returns data to the operand buffer 300 the operand buffer controls will mark the buffer with valid data as data valid 320 and request done 330.

Referring now to FIGS. 1 and 4, if there are no cache line invalidations when the execution unit(s) read the data from the operand buffer 300 the logic of operand buffer 300 signals the cache 200 over a opbuffer reset bus 450 and signals the operand fetch logic 100 over an opbuffer reset bus 460 that the buffer X is no longer in use. The operand buffer holds the data until the data is used in correct program order execution. If there is a line invalidation from a storage hierarchy info 470, the cache determines if the invalidated line is the same line as that being used by a currently valid operand buffer. The cache storage 200 is configured to have knowledge of which cache lines are currently in the operand buffer 300. The cache storage 200 monitors these lines for invalidation from the storage hierarchy info 470. If there is a currently valid operand buffer the cache 200 will indicate which buffers were invalidated over an opbuffer invalidation info bus 480.

The operand buffer 300 examines information about the current instruction being read by the execution unit(s) to determine an instruction opbuffer read pattern 360 and where a current read pointer 370 is located. Based on this information (i.e., instruction opbuffer read pattern 360 and current read pointer 370) the logic of operand buffer 300 will determine which operand buffers should be marked as data lost 340 because of the cache line invalidation.

The logic of both operand fetch 100 and operand buffer 300 to support this invention maintain information for each operand buffer indicative of where the data was fetched from storage and indicative of current program execution. Information is kept for each doubleword from storage indicative of a doubleword address in the storage line, which virtual address line, information to allow the cache 200 to access the correct virtual storage to absolute storage (address translation) mapping. In sum, information is maintained indicating which storage each doubleword(s) of data came from, if the data is valid, and if the data has been invalidated for each doubleword of data that the execution unit(s) will operate on, as well as the current point in the operand where data is being read by the execution units is maintained, as discussed above.

When reading of operand buffers for an executing instruction with an operand longer than a doubleword reaches a buffer that is marked as data lost 340, instruction execution is suspended. All data past the point in the operand with valid data at the current read point is marked invalid. All requests being made to the cache storage for future or subsequent operand data is stopped. The logic of operand buffer 300 signals the operand fetch logic 100 over the re-fetch buffer info bus 410 that the data in that buffer must be re-fetched from cache 200. The operand is re-fetched from the cache storage using information that is kept about each operand buffer and each doubleword that was fetched to fill that operand buffer. The operand fetch logic 100 will stop making requests for future buffers while accessing the information about the buffer that must be re-fetched. Operand fetch logic 100 uses the information about the buffer to know which doubleword to start re-fetching at for which operand.

The above described re-fetch will continue until one of the following conditions is met: reach the end of the buffer, reach the end of the cache line, or reach the current point in the operand where the operand fetch logic was fetching.

When the cache 200 returns data to the operand buffer 300 over the cache return bus 440, the cache 200 is required to return valid data for at least the first request sent for the re-fetch before the data can be invalidated again by the cache. When operand data returns for the re-fetched data, program execution resumes without canceling the instruction that experienced the operand data invalidation and completes the operand re-fetch. In this manner, the instruction that was temporarily suspended resumes execution without being canceled For example, many processors may be attempting to access the same storage. If the instruction were just aborted in every instance, this would lead to a processor hang in which no forward progress in the instruction execution occurs since multiple processors would be attempting access to the same storage causing the instruction to be restarted frequently.

The operand fetch logic keeps information about which operand number (e.g., cache line location, doubleword offset into the line, and alignment of the data in the operand buffer), validity of data, and exception information about each part of each operand buffer. It should be noted that each buffer can have data from two different doublewords of cache data. The operand fetch logic also keeps information about a current point of execution and the instruction type. The operand fetch logic then can invalidate each part of each buffer as needed. The cache storage 200 keeps information about which line each doubleword request comes from to process the invalidations. To ensure forward progress, the cache on a re-fetch event must always return data for the first doubleword request before invalidating it again, if required.

The above described exemplary embodiment discloses a system and method for a contemplated zSeries system where the processor is configured to support out-of-order operand fetching with in-order execution of instructions. The system and method include logic in the operand fetch configured to detect whether a data element was fetched out of order and indicating the same. The logic in the operand fetch then invalidates the data fetched out of order and requests that the data starting at the current location be re-fetched so that the architectural data ordering may be preserved. Only instructions with long operands (e.g., longer than a single doubleword) experience the situation described above.

In summary, many processors may be after the same storage and there may be a valid storage indicated in the system that maybe have been updated by one or more processors other than the processor currently fetching. In order to execute, the processor currently fetching from that line must give it up and then later get it back (with possibly altered data) and the executing instruction will not be aborted but just pick a point at which the update is noticed.

Once conventional processors initiate execution of an instruction, the instruction can not be aborted except by a recovery action, in which case if this occurs too often, will not produce acceptable performance. It is important to note that once an instruction with long operands has started execution that it can not and should not be killed or aborted. For example, many processors may be attempting to access the same storage. If the instruction were just aborted in every instance, this would lead to a processor hang in which no forward progress in executing the current instruction would occur since multiple processors would be attempting access to the same storage.

In an exemplary embodiment of a system and method to detect out-of-order fetch with operand re-fetch to correct out-of-order operand fetch described herein, the operand fetch logic maintains information about each doubleword of data fetched for each buffer. The operand fetch logic keeps information about which operand number (e.g., cache line location, doubleword offset into the line, and alignment of the data in the operand buffer), validity of data, and exception information about each part of each operand buffer. It should be noted that each buffer can have data from two different doublewords of cache data. The operand fetch logic also keeps information about a current point of execution and the instruction type. The operand fetch logic then can invalidate each part of each buffer as needed. The operand buffer logic maintains information about each operand buffer, which may not be the same as the information about each doubleword. The cache storage 200 keeps information about which line each doubleword request comes from to process the invalidations.

Based on invalidation information from the cache on each doubleword, it is determined which doublewords of data need to be invalidated. Then, based on each of the buffers invalidated, information is sent to the operand fetch logic to indicate which data must be re-fetched. All data after that point in the operand is invalidated and the operand fetch logic re-fetches the required data to maintain the architectural storage rules. Thus, a system and method is disclosed that allows instructions having long operands to execute architecturally correct and does not require instructions with long operands to be killed and started all over again. Instead, the affected buffers having invalid data are invalidated and the operand fetch logic re-fetches the required data to maintain the architectural storage rules. To ensure forward progress, the cache on a re-fetch event must always return data for the first doubleword request before invalidating it again, if required.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A processor having data and instruction storage, the processor being one of a plurality of processors in a multi-processor system (MP) supporting a instruction set architecture in which the storage consistency provides instruction data operands to appear to have been accessed in sequential program execution order as observed by all sequential programs executing in the system, the processor comprising:
   means to re-fetch operand data that may have been returned out of order with respect to sequential program execution after cache line invalidation in the multiprocessor system that does not require the currently executing instruction to be killed and start execution again;
   operand fetch logic for making data operand fetch requests based on sequential program execution order and is configured to maintain information including the cache line address and offset in the cache line that is indicative of where the operand data is fetched from in storage to support operand data re-fetch at a time after the operand data has been invalidated and starting at a point past the beginning of the data operand;
   a cache storage for returning instruction data operands to an operand buffer out of order from that of the data operand fetch request order based on sequential program execution that also supports cache line invalidation due to storage update from a single or plurality of processors in the multiprocessor system that is also configured to maintain information about which cache line each eight byte block called a doubleword of operand data came from in order to indicate to the operand buffer when a given doubleword has been invalidated in the cache storage; and
   an operand buffer configured with operand buffer logic, the operand buffer logic configured to maintain information about the invalidation state of each operand buffer, which holds up to one doubleword of operand data, and the current point of execution in the data operand of the instruction currently executing and is configured to detect and signal which operand buffer needs to begin the operand re-fetch for a point where the data invalidation is detected to support architecture data consistency;
   wherein the providing operand re-fetch is configured for an instruction having operand longer that eight bytes in length.

2. A processor as in claim 1 wherein the processor implements an architecture that allows an operand to be updated during execution of the instruction with storage ordering rules that require wily new updated data to be used after the point where the data invalidation is detected in the operand by performing the operand re-fetch to obtain the new updated data.

3. A processor as in claim 1 wherein the point in the operand when the line invalidation is detected based on operand buffer invalidation information and where in the operand the data is being currently read to keep as much valid data as is architecturally allowed before marking the point of cache line invalidation.

4. A processor as in claim 1 wherein the operand that is invalidated and to be re-fetched may be invalidated and re-fetched more than one time during the course of the execution of a single instruction.

5. A processor as in claim 1 wherein the operand re-fetch includes fetching two operands for a single instruction, the re-fetch for the two operands happens at different or simultaneous times for each operand during execution.

6. A processor as in claim 1 wherein when the providing operand re-fetch occurs the cache storage is required to return a first buffer of the operand with valid data before the line may again be invalidated, such that with a current read pointer information in the operand buffer logic, at least one doubleword will be kept as valid before the line can be again allowed to be invalidated to unsure forward progress of execution of the operand even when there are repeated line invalidations by at least one of the plurality of processors in the multiprocessor system.

7. A method to detect and re-fetch data that is fetched out-of-order in a processor of a multiprocessor system, the method comprising:
   decoding and executing instructions from an executing program in program order;
   fetching operand data for the instruction to execute from a cache storage to operand buffers;
   a cache storage that can indicate when each eight byte block of data representing a doubleword from a cache line that has been updated in storage by a processor in the multiprocessor system;
   detecting a point based on the invalidation where data has been fetched out-of-order;
   invalidating all data past the point where data is fetched out-of-order;
   providing operand re-fetch at a point past the beginning of the data operand after cache line invalidation due to the out-of-order fetch with out canceling the instruction and re-executing the instruction;
   configuring operand fetch logic to maintain information indicative of where data is fetched from to support operand re-fetch;
   configuring a cache storage with line invalidation and configured to maintain information about which line a doubleword request comes from to process the invalidations; and
   configuring an operand buffer with operand buffer logic, the operand buffer logic configured to maintain information about a state of each operand buffer and configured to signal which operand buffer needs to begin the operand re-fetch for a point where the data invalidation is detected;
   wherein the providing operand re-fetch is configured for an instruction having operands longer than eight bytes in length.

8. A method as in claim 7 further comprising:
   implementing an architecture that allows an operand to be updated during execution of the instruction with storage ordering rules that require only new updated data to be used after the point where the data invalidation is detected in the operand by performing the operand re-fetch to obtain the new updated data.

9. A method as in claim 7 wherein the point in the operand when the line invalidation is detected based on operand buffer invalidation information and where in the operand the data is being currently read to keep as much valid data as is architecturally allowed before marking the point of cache line invalidation.

10. A method as in claim 7 wherein the operand that is invalidated and to be re-fetched may be invalidated and re-fetched more than one time during the course of the execution of a single instruction.

11. A method as in claim 7 wherein providing operand re-fetch includes fetching two operands for a single instruction, the re-fetch for the two operands happens at different or simultaneous times for each operand during execution.

12. A method as in claim 7 wherein when the providing operand re-fetch occurs the cache storage is required to return a first buffer of the operand with valid data before the line may again be invalidated, such that with a current read pointer information in the operand buffer logic, at least one doubleword will be kept as valid before the line can be again allowed to be invalidated to ensure forward progress of execution of the operand even when there are repeated line invalidations by on at least one of the plurality of processors in the multiprocessor system.

* * * * *